LE ROY WILLOUR.
TIRE SAVER.
APPLICATION FILED JULY 11, 1910.

995,583.

Patented June 20, 1911.

2 SHEETS—SHEET 1.

Witnesses
J. Milton Jester.
B. V. Fishburne

Inventor
Le Roy Willour.
By C. L. Parker,
Attorney

THE NORRIS PETERS CO., WASHINGTON, D. C.

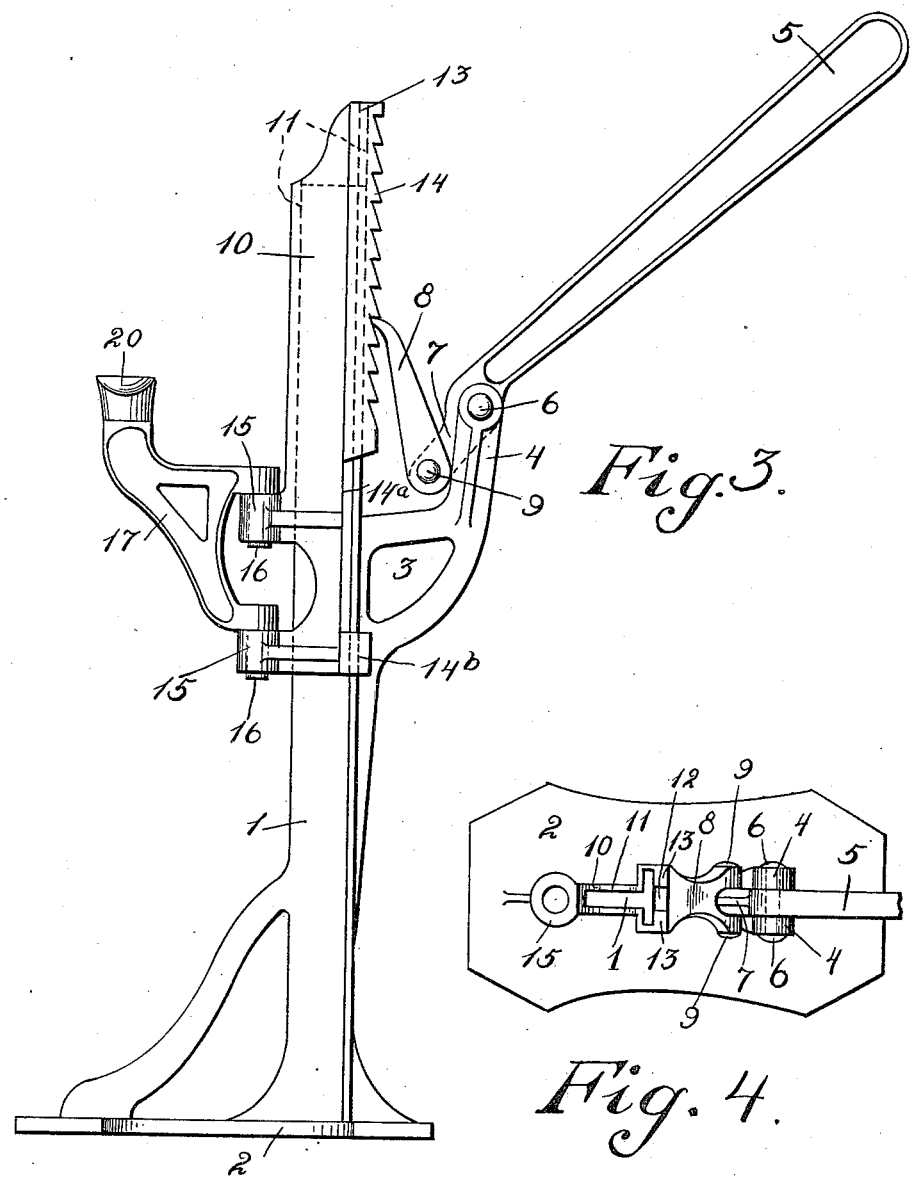

UNITED STATES PATENT OFFICE.

LE ROY WILLOUR, OF ASHLAND, OHIO, ASSIGNOR TO THE ASHLAND MANUFACTURING COMPANY, OF ASHLAND, OHIO, A CORPORATION OF OHIO.

TIRE-SAVER.

995,583.  Specification of Letters Patent.  Patented June 20, 1911.

Application filed July 11, 1910. Serial No. 571,335.

*To all whom it may concern:*

Be it known that I, LE ROY WILLOUR, a citizen of the United States, residing at Ashland, in the county of Ashland and State of Ohio, have invented certain new and useful Improvements in Tire-Savers, of which the following is a specification.

My invention relates to new and useful improvements in lifting-jacks.

An important object of this invention is to provide a jack for use in connection with automobiles or the like, which may be quickly operated to raise the axle of the machine for repairing a pneumatic tire. By the employment of my jack, a wheel of a vehicle may be quickly raised, so that the pneumatic tire upon the same may be removed for the purpose of repair, or the like.

A further object of this invention is to provide a lifting-jack which is self-locking when supporting its load.

A further object of this invention is to provide a lifting-jack of simple construction, and which is composed of few parts, which are readily separable, whereby the jack may be stored away in a small space.

Other objects and advantages of this invention will be apparent hereinafter.

Figure 1:
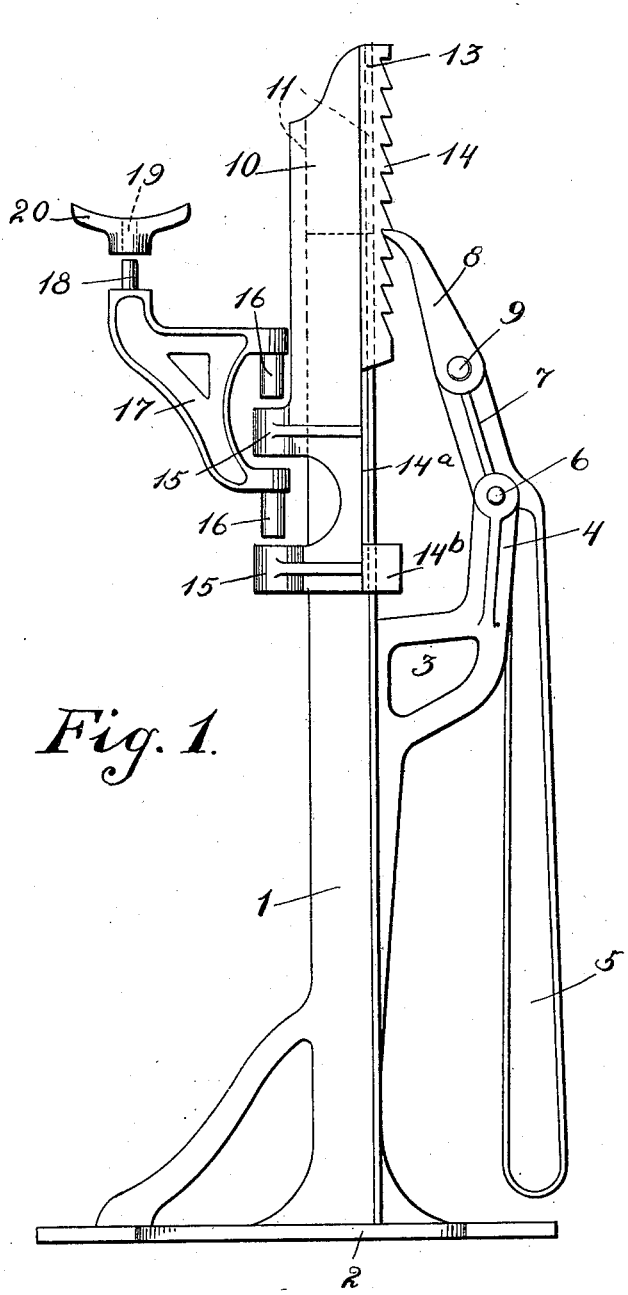
Figure 2:
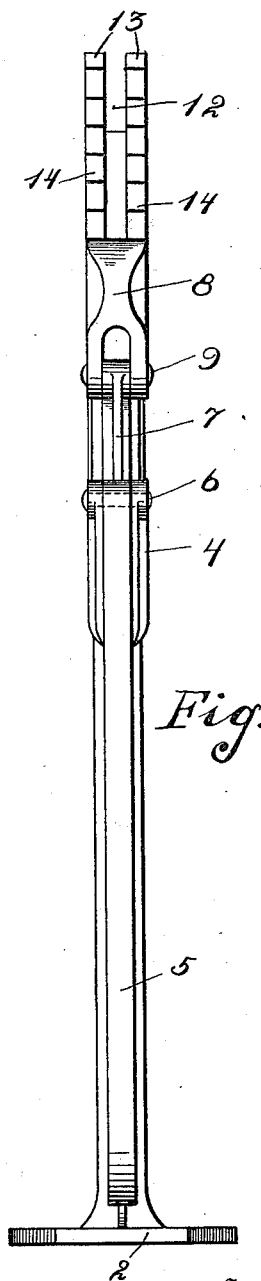

In the accompanying drawings, forming a part of this specification and in which like numerals are employed to designate like parts throughout the same, Figure 1 is a side view of the jack, the operating lever being shown in its lowermost position. Fig. 2 is an end view of the same. Fig. 3 is a side view of the jack, showing the operating lever in its raised position, and Fig. 4 is a plan view of the jack.

In the drawings, wherein is illustrated a preferred embodiment of my invention, the numeral 1 designates a vertically disposed standard, which is substantially T-shaped in cross-section. This standard is mounted upon a base 2, as shown. This standard is provided near its center and upon one side thereof, with a bracket 3, which is preferably cast integral with the standard. This bracket comprises upstanding spaced ears 4, between which is pivotally mounted an operating lever 5, as shown at 6. As shown, this operating lever is fulcrumed intermediate of its ends, and has an upper portion 7 which is angularly disposed with relation to the lower portion of said operating lever. This upper portion 7 of the operating lever, has the bifurcated end of a pawl 8 pivotally connected with its free end, as shown at 9.

Slidably mounted upon the standard 1 is a lift-casing 10, having an axial opening 11 formed therethrough for the reception of said standard. The lift-casing is further provided with an opening 12 extending longitudinally through the same, which merges into the T-shaped opening 11 and also forms spaced sections 13. The outer walls of these spaced sections are provided with ratchet-teeth 14, as shown, which are engaged by the pawl 8. The lift-casing 10 is provided with cut-out portions $14^a$, as shown, and said casing is further provided adjacent its lower end with spaced guides $14^b$, for engagement with the standard 1.

The lift-casing 10 is provided upon its side opposite the ratchet-teeth 14, with superposed spaced knuckles 15. These knuckles are arranged near the lower end of the lift-casing and are provided with axial openings formed therethrough for rotatably receiving pins 16, which are rigidly mounted upon a bracket 17. This bracket is therefore removably and pivotally mounted upon the lift-casing 10. The bracket 17 is provided at its uppermost portion, with a vertically disposed pin 18, which is adapted to loosely fit within an opening 19 formed through an engaging-head 20. This engaging-head is removably and rotatably mounted upon the bracket 17.

In the use of my jack the lift-casing 10 is elevated to bring the head 19 into engagement with the load. The operating lever 5 is raised to its uppermost position prior to the movement of the lift-casing, above referred to. The operating lever is then forced downwardly to assume a substantially vertical position, as clearly illustrated in Fig. 1, whereby the lift-casing 10 will be further elevated and the load raised.

Special attention is called to the fact that when the lift-casing 10 is supporting its load and the operating lever is arranged in its lowermost position, said operating lever cannot then be oscillated upwardly by the downward pressure upon the lift-casing 10. The lift-casing 10 together with its load may be lowered by the operator swinging the lever 5 upwardly.

I wish it understood that the form of my invention herewith shown and described is to be taken as a preferred example of the same, and that certain changes in the size, shape and arrangement of parts may be resorted to without departing from the spirit of my invention or the scope of the subjoined claims.

Having thus fully described my invention what I claim as new and desire to secure by Letters Patent, is:—

1. In a lifting jack, a standard, a lift-casing having slidable engagement therewith, a bracket connected with said standard approximately midway of its ends, a lever pivoted to said bracket, said lift-casing being provided with teeth, a pawl pivotally connected with said lever to engage said teeth, said lift-casing being provided with apertured knuckles, and a second bracket carrying pins for insertion within said apertured knuckles.

2. In a jack of the character described, a standard, a lift member having slidable engagement therewith, means to raise and lower said lift member, a laterally extending arm pivotally connected with said lift member below the upper end of said lift member, said laterally extending arm being adapted to be oscillated in a substantially horizontal plane to assume different radial positions with relation to said lift member, and a head rotatably mounted upon said laterally extending arm.

3. In a jack for use in connection with vehicles, a standard, a lift-member slidably mounted upon and exteriorly of said standard and adapted to be entirely removed from the standard upon an upward movement of said lift-member, means to raise and lower the lift-member and having detachable engagement therewith to permit of the removal of the lift-member from the standard, and a laterally extending arm pivotally connected with the lift-member so that said arm may be readily removed therefrom, said arm being adapted to oscillate in a horizontal plane to assume different radial positions with relation to said lift-member.

In testimony whereof I affix my signature in presence of two witnesses.

LE ROY WILLOUR.

Witnesses:
C. G. PHILLIPS,
G. M. BENINGHOF.

---

Copies of this patent may be obtained for five cents each, by addressing the "Commissioner of Patents, Washington, D. C."